United States Patent [19]

Shimizu

[11] Patent Number: 4,715,461
[45] Date of Patent: Dec. 29, 1987

[54] ELECTRIC POWER STEERING SYSTEM FOR VEHICLES

[75] Inventor: Yasuo Shimizu, Tochigi, Japan

[73] Assignee: Honda Giken Kogyo Kabushiki Kaisha, Tokyo, Japan

[21] Appl. No.: 820,347

[22] Filed: Jan. 21, 1986

[30] Foreign Application Priority Data

Jan. 22, 1985 [JP] Japan ................................. 60-9545
Jan. 22, 1985 [JP] Japan ................................. 60-9546

[51] Int. Cl.[4] .............................................. B62D 5/04
[52] U.S. Cl. ................................................. 180/79.1
[58] Field of Search ...................... 180/79.1, 141, 142; 74/388 PS

[56] References Cited

U.S. PATENT DOCUMENTS

| | | | |
|---|---|---|---|
| 4,473,128 | 9/1984 | Nakayama et al. | 180/142 |
| 4,518,055 | 5/1985 | Yagi et al. | 180/142 |
| 4,530,413 | 5/1983 | Buike et al. | 180/79.1 |
| 4,556,116 | 12/1985 | O'Neil | 180/79.1 |
| 4,557,342 | 12/1985 | Drutchas | 180/142 X |
| 4,561,515 | 12/1985 | Hashimoto et al. | 180/79.1 |
| 4,570,734 | 3/1984 | Taig | 180/79.1 |
| 4,573,545 | 3/1986 | Kalns | 180/79.1 |
| 4,574,903 | 11/1983 | Hashimoto et al. | 180/79.1 |
| 4,577,716 | 6/1984 | Norton | 180/79.1 |
| 4,582,155 | 4/1986 | Ohe | 180/79.1 |

FOREIGN PATENT DOCUMENTS

2242009 3/1975 France ............................ 180/79.1
59-70257 4/1984 Japan .

Primary Examiner—John J. Love
Assistant Examiner—Charles R. Watts
Attorney, Agent, or Firm—Armstrong, Nikaido, Marmelstein & Kubovcik

[57] ABSTRACT

An electric power steering system for vehicles including a driving control circuit (76, 100, 108) for feeding, in consideration of an output signal ($S_1$, $S_2$) from a steering torque dectection mechanism (77) for detecting steering torque (Ts) acting on an input shaft (4), a drive signal (Va) to an electric motor (33) for producing auxiliary torque to be supplied to an output shaft (7). The steering system further comprises a detection mechanism (82) for detecting the steering speed (Ns) of the input shaft (4), and the driving control circuit (76, 100, 108) is adapted to feed the drive signal (Va) to the electric motor (33) in consideration of an output signal ($S_4$, $S_5$) from the steering speed detection mechanism (82) as well as of the output signal ($S_1$, $S_2$) from the steering torque detection mechanism (77). The driving control circuit (76, 100, 108) includes a micro-computer unit (76) for determining by address designation a control signal ($T_3$, $T_4$, $T_5$) as basis of the drive signal (Va) to the elecric motor (33), depending on the output signal ($S_1$, $S_2$) from the steering torque detection mechanism (77) and the output signal ($S_4$, $S_5$) from the steering speed detection mechanism (82).

8 Claims, 14 Drawing Figures

ELECTRIC POWER STEERING SYSTEM FOR VEHICLES

BACKGROUND OF THE INVENTION

1. Field of the Invention

The present invention generally relates to a power steering system for vehicles. More particularly, the invention relates to an electric power steering system for vehicles which produces ausiliary torque for steering by means of a steering serve unit using an electric motor.

2. Description of Relevant Art

In view of the problems of hydraulic type power steering system such as the structure thereof is complicated, recent years have proposed a variety of electric type power sttering systems for vehicles.

Exemplarily, in Japanese Patent Application Lay-Open Print No. 59-70257, laid open on Apr. 20, 1984, there is disclosed an electric power steering system for vehicles of an analogue control type.

This electric power steering system for vehicles includes an input shaft as a steering shaft connected to a steering wheel, an output shaft interconnected through a universal joint with the input shaft and through a gear mechanism of a rack and pinion type with a tie rod of a steered wheel. An electric motor supplies auxiliary torque through a reduction gearing to the output shaft. A torque detection mechanism is disposed on the input shaft to detect steering torque acting on the input shaft, and a driving control circuit produces, based on a detection signal from the torque detection mechanism, a torque magnitude signal and a torque direction signal representing the magnitude and the direction of the steering torque acting on the input shaft, respectively. The driving control circuit feeds the electric motor with an armature current in proportional relation to the quantity to the torque magnitude signal and in accordance to the direction of conduction with the torque direction signal.

The torque detection mechanism consists of a strain gauge sensor.

With such an arrangement, when the steering wheel is operated, the output shaft is applied with adequate auxiliary torque from the electric motor, so that the steering operating is facilitated.

In the electric power steering system described, however, the driving of the electric motor is controlled in such a manner that auxiliary torque, the magnitude of which is substantially proportional to that of the steering torque acting on the input shaft, is applied to the output shaft, irrespective of the speed of rotating operation of the steering wheel.

In the electric power steering system described, therefore, there might exist such a possibility that the steering speed of the steering wheel and the rotation speed of the electric motor may fail to be always kept in a well-matched relationship to each other.

In recent years, there is a tendency to utilize microcomputer systems, which fundamentally are for processing digital signals, as control devices of various working systems, since they have the advantage that complicated control functions can be achieved with a relatively simple system constitution.

It is thus desirous to employ a micro-computer system as a control device for such a steering system as described.

However, in general, the micro-computer system is unable to simultaneously read many input signals, and process operations thereof are sequentially performed in accordance with a system clock pulse. As a result, there is a restriction or problem such that it needs a predetermined process time to attain, with a micro-computer system, various control function similar to those of an analogue control circuit in, for example, the conventional power steering system described.

In this respect, in the case of a micro-computer system responsible for a feedback control, such a problem is remarkable due to the necessity of repeating a feedback loop so many times.

For such reasons, in the cse where a micro-computer system is utilized as a control device of an electric power steering system, there might be a possibility such that the control of an electric motor adapted to produce auxiliary torque may fail to always sufficiently follow up the speed of steering operation.

The present invention has been achieved to effectively solve the problems of conventional electric power steering systems as described. Particularly, the invention has been achieved to overcome, even in the case where to solve such problems a micro-computer system is utilized as a control device, the aforementioned restriction or problem attendant thereon.

SUMMARY OF THE INVENTION

Accordingly, an object of the present invention is to provide an electric power steering system for vehicles, in which the rotation speed of the electric motor is permitted to favorably match with the steering speed of a steering wheel, thus achieving optimum feeling of steering.

Another object of the present invention is to provide, while employing a micro-computer system as a control device of such a steering system, an electric power steering system for vehicles in which an electric motor is permitted to be controlled so as to sufficiently follow up the steering operation speed.

To achieve such an object, the present invention provides an electric power steering system for vehicles including an input shaft operatively connected to a steering wheel, an output shaft operatively connected to a steered wheel, an electric motor for operatively supplying auxiliary torque to the output shaft, a means for detecting steering torque acting on the input shaft, and a driving control means for feeding the electric motor with a drive signal in consideration of an output signal from the steering torque detecting means. The system further comprising a means for detecting a steering speed of the input shaft, wherein the driving control means is to feed the electric motor with the drive signal in consideration of an output signal from the steering speed detecting means as well as the output signal from the steering torque detecting means.

Preferably, the driving control means comprises a micro-computer unit receiving the output signal from the steering torque detecting means and the output signal from the steering speed detecting means to thereby determine to output a motor control signal representing the content of the drive signal to be fed to the electric motor. A motor driving means receives the motor control signal and feeds the motor drive signal to the electric motor in accordance with the motor control signal. The micro-computer unit is to determine the motor control signal in an address designating manner in accordance with both the output signal from the steering torque detecting means and the output signal from the steering speed detecting means.

The above and further features, objects and advantages of the present invention will more fully appear from the following detailed description of a preferred embodiment of the invention when the same is read in conjunction with the accompanying drawings.

DETAILED DESCRIPTION OF THE PREFERRED EMBODIMENT

Figure 1:
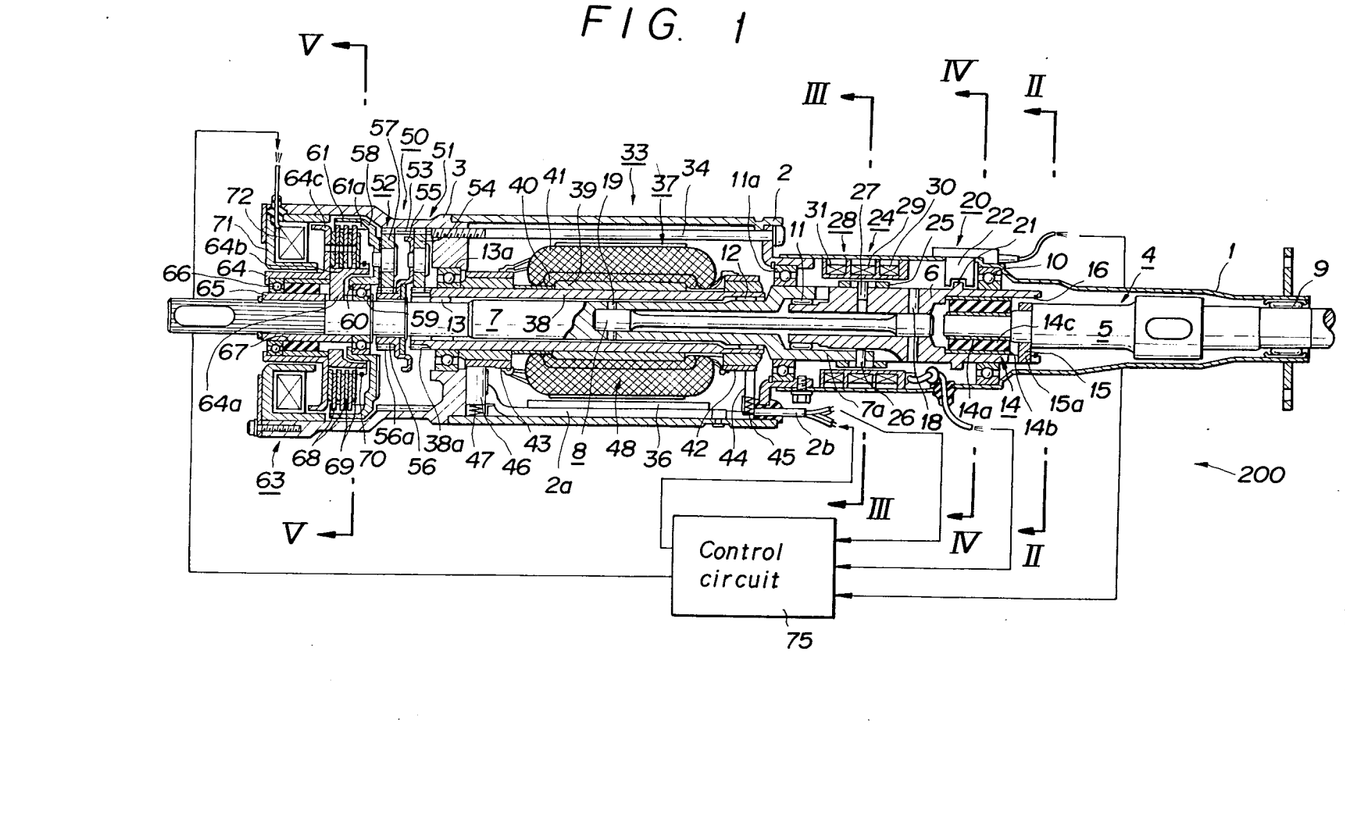
FIG. 1 is a longitudinal quarter-cutaway sectional view of an electromagnetic servo device as an essential part of an electric power steering system for vehicles according to a preferred embodiment of the present invention.

Referring first to FIG. 1, designated at reference numeral 200 is the entirety of an electromagnetic servo device as an essential part of an electric power steering system for vehicles according to a preferred embodiment of the present invention, as it is equipped in a vehicle (not shown). The servo device 200 includes an input shaft 4 connected at the right end thereof in FIG. 1 to a steering wheel (not shown) of the steering system. A steering column 1 accommodates therein the input shaft 4. The steering column 1 is fixed to a body (not shown) of the vehicle. An output shaft 7 is connected at the left end thereof in FIG. 1 to a steering gearbox (not shown) for steered wheels (not shown) of the vehicle. The output shaft 7 is coaxially arranged relative to the input shaft 4. A casing 3 accommodates therein the output shaft 7, and a stator 2, of a later-detailed electric motor 33. The stator 2 is integrally joined to the column 1 and the casing 3.

The input shaft 4 is loose-fitted at the axially innermost part thereof in the axially innermost part of the output shaft 7, while those innermost parts of the shafts 4, 7 are interconnected with each other through a torsion bar 8 arranged coaxial with the shafts 4, 7. The input and the output shafts 4, 7 are rotatably held in position by means of a pair of bearings 9, 10 and a triple of bearings 11, 12, 13, respectively.

The electromagnetic servo device 200 is constituted with a steering speed sensor 20 arranged around the input shaft 4, and a steering torque sensor 24 arranged around the loose-fitted innermost parts of the input and the output shafts 4, 7. The electric motor 33 is a direct-current type coaxially arranged around the output shaft 7 and to supply auxiliary torque to the shaft 7 as will be described later. A reduction gearing 50 and an electromagnetic clutch 63 are provided. A control device is provided for driving to control the electric motor 33 and the electromagnetic clutch 63 in accordance with respective detection signals output from the steering speed sensor 20 and the steering torque sensor 24.

More particularly, the input shaft 4 is separated into a first shaft 5 and a tubular second shaft 6. The first shaft 5 has at the axially outer end thereof, that is, at the right end thereof in FIG. 1, the steering wheel secured thereto, as described, and is connected at the axially inner end thereof to the tubular second shaft through a rubber bush 14 interposed therebetween for preventing the transmission of vibrations. The rubber bush 14 consists of a radially inner and an outer metallic tubes 14a, 14b and an elastic member 14c interposed therebetween. The inner tube 14a is fixed on the first shaft 5, and the outer tube 14b, in the second shaft 6.

Figures 2, 3A, 3B, 3C, 4, 5:
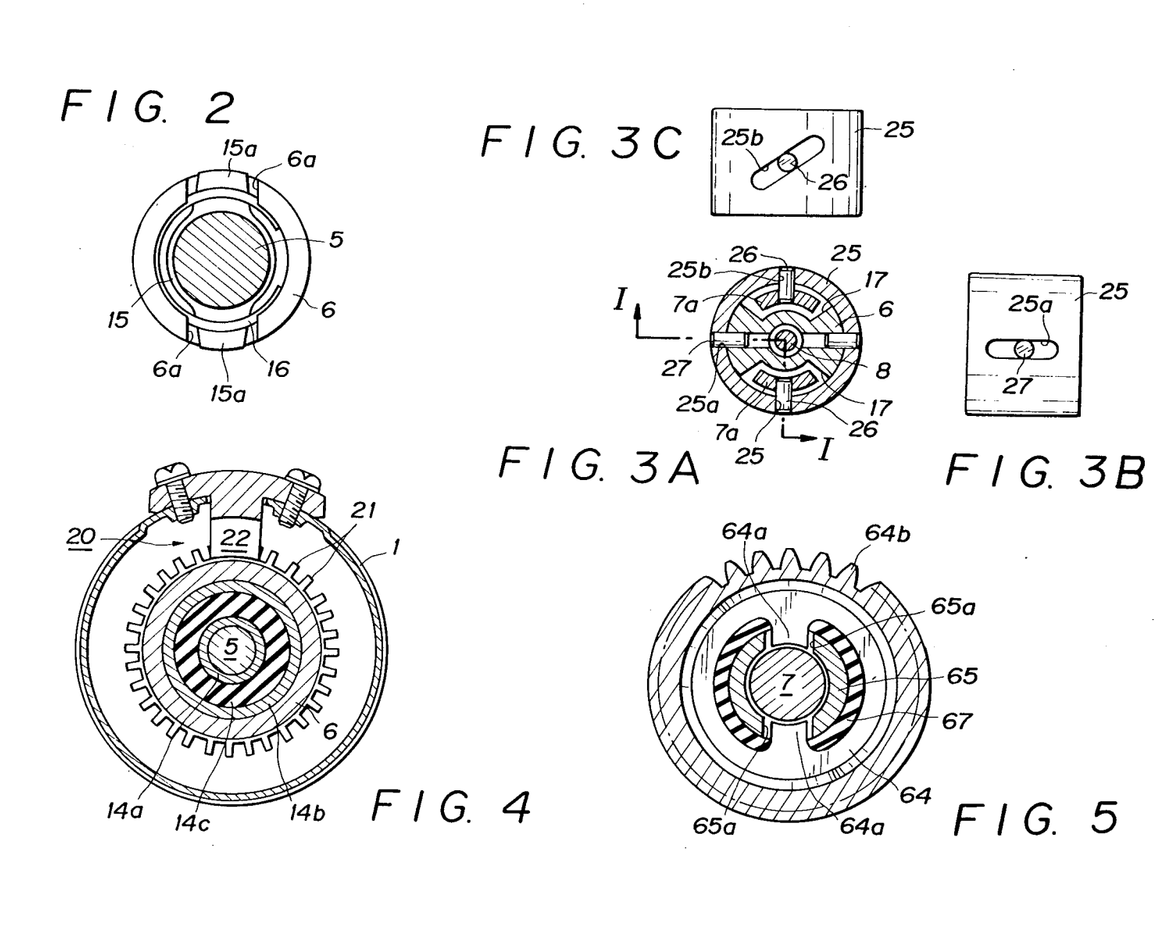
FIG. 2 is a cross-sectional view along line II—II of FIG. 1.
FIG. 3A is a cross-sectional view showing a mobile ferrous member of a steering torque sensor of the electromagnetic servo device, along line III—III of FIG. 1.
FIGS. 3B and 3C are a side and a top views of the mobile member of FIG. 3A, respectively.
FIG. 4 is a cross-sectional view along line IV—IV of FIG. 1.
FIG. 5 is a cross-sectional view along line V—V of FIG. 1.

Further, as shown in FIG. 2, at the axially inner end part of the first shaft 5 there is fixedly fitted thereon an annular member 15 having a pair of radially outward projections 15a circumferencewise spaced apart from each other. The projections 15a are inserted in a pair of slots 6a, with a proper angular gap left, respectively. The slots 6a are formed at the axially outer end of the second shaft 6, that is, at the right end thereof in FIG. 1. The first and second shafts 5, 6, elastically interconnected with each other by the rubber bush 14, are thus permitted, by the gaps, to be angularly displaced relative to each other and by the annular member 14, to be locked relative to each other after a predetermined relative angular displacement therebetween. Thus, the elastic member 14c is prevented from being subjected to larger torques than predetermined in the twisting direction thereof. A circle clip 16 is for preventing the annular member 15 from coming out of place.

Furthermore, as shown in FIGS. 3A to 3C, the second shaft 6 has, at the axially opposite end thereof, that is, at the left end thereof in FIG. 1, a pair of axially extended grooves 17 formed therein at an angular spacing of 180°. The output shaft 7 has, in the axially innermost part thereof which is enlarged in diameter and supported by the stator 2 through a bearing 11a, a pair of axially extended projectios 7a formed at respective positions corresponding to the grooves 17 of the second shaft 6. The projections 7a are inserted in the grooves 17, leaving a predetermined gap, respectively. Moreover, at the same end, the second shaft 7 is reduced, and this reduced part is inserted in, to be supported by, the enlarged innermost part of the output shaft 7.

In respective axially inner end portions of the second shaft 6 and the output shaft 7, there are formed opposing axial holes coaxial relative to each other to have coaxially disposed therein the torsion bar 8, which is secured at one end thereof (at the right end thereof in FIG. 1) by a pin 18 to the second shaft 6 and at the axially opposite end by another pin 19 to the output shaft 7. The axially outer end of the output shaft 7 is interconnected, by means of splines formed thereon, with the steering gearbox as a member at the loading side, as described. Accordingly, steering torque applied from the steering wheel to the input shaft 4 is transmitted through deformation of the torsion bar 8 to the output shaft 7 as well as to members at the loading side. In this respect, the rubber bush 14 interposed between the first and the second shafts 5, 6 of the first shaft 4 is set more rigidly or harder to deform than the torsion bar 8 interposed between the second shaft 6 and the output shaft 7.

As shown in FIG. 4, the steering speed sensor 20 is constituted as a rotation speed sensor comprising a plurality of radially outward projections 21 equi-angularly provided along the circumference of the second shaft 6, and a photo-coupler 22 as a photoelectric pickup fixed to the steering column 1 at such a position that the photo-coupler 22 has light-projecting and light-receiving elements thereof disposed either at both sides of a plane on which the radial projections 21 are going round. In the sensor 20, those beams of light intermittently transmitted through gaps between the projections 21 and received are transduced into electric impulses to be output.

The steering torque sensor 24 comprises a differential transformer consisting of a mobile tubular ferrous core member 25 axially slidably fitted around the mutually engaged innermost parts of the second shaft 6 of the input shaft 4 and the output shaft 7, and a winding part 28. As shown in FIGS. 3A to 3C, the mobile core member 25 has formed therethrough a pair of first elongate holes 25a engaged with a pair of pins 26 radially projecting from the axial projections 7a of the output shaft 7 and a pair of second elongate holes 25b engaged with another pair of pins 27 axially projecting from the second shaft 6. These radial pins 27 are each respectively angularly spaced apart at 90° from either of those radial pins 26. The first elongate holes 25a are formed in the axial direction of the core member 25, and the second elongate holes 25b, inclined at a necessary angle with respect to the axis of the member 25. As a result, in accordance with an angular difference circumferencewise developed between the second shaft 6 and the output shaft 7, the inclined elongate holes 25 cooperate with the pins 26 engaged therewith to cause the mobile core member 25 to move in the axial direction, so that the core member 25 is displaced in accordance with the steering torque acting on the input shaft 4 or on the second shaft 6 thereof.

More particularly, in the case where steering torque is applied to the second shaft 6 in the clockwise direction, when viewed at the side of the steering wheel, and load torque larger than the steering torque is imposed on the output shaft 7, the second shaft 6 is thus rotated relative to the output shaft 7 in the clockwise direction when viewed at the side of the steering wheel. The mobile core member 25 is moved upwardly in FIG. 3C, that is, rightwardly in FIG. 3B or leftwardly in FIG. 1.

In the case where the second shaft 6 is rotated relative to the output shaft 7 in the counterclockwise direction when viewed at the side of the steering wheel, then the core member 25 is moved in the opposite direction to the above.

In either of the foregoing cases, due to the inclined elongate holes 25b of the mobile core member 25 engaged with the radial pins 26 provided at the side of the output shaft 7, the holes 26 are so shaped as to have a straight-linear form when the tubular core member 25 is manufactured. The core member 25 has an axial displacement in the moving direction from an original middle or neutral position thereof in proportion to the circumferencewise relative angular displacement between the second shaft 6 as an input side member and the output shaft 7.

In this respect, the mobile core 25 is to be located at the middle position under the condition that no steering torque is acting on the input shaft 4 and hence the relative angular displacement between the second shaft 6 and the output shaft 7 is kept zero. In the state shown in FIGS. 1 and 3A to 3C, the core member 25 is supposed to be located at such a middle position.

Further, in the differential transformer, the winding part 28 arranged around the mobile core member is constituted with a primary winding 29 having a pulse signal input thereto. A pair of secondary windings 30, 31 is coaxially disposed at both sides of the primary winding 29 and produces an output signal corresponding to the axial displacement of the core member 25. Accordingly, as the relative angular displacement between the second shaft 6 and the output shaft 7 develops with deformation of the torsion bar 8, the axial displacement of the mobile core member 25 is transduced into electric signals to be output.

The electric motor 33 comprises the stator 2 of a cylindrical form integrally joined by means of bolts 34 to both the steering column 1 and the casing 3. The stator 2 has at least one pair of magnets 36 fixed to the inside thereof. A rotor 37 is rotatably arranged around the output shaft 7. The rotor 37 includes a tubular shaft 38 free-rotatably fitted on the output shaft 7 by means of needle bearings 12, 13 interposed therebetween and likewise supported by the casing 3 through a ball bearing 13a. An armature assembly is integrally fixed on the tubular shaft 38. The assembly consists of a laminated ferrous core 39 having skew slots formed therein for placing a first multiple winding 40 and a second multiple winding 41 to be laid thereon, with a fine air gap left between the magnets 36 and the second winding 41. Moreover, the tubular shaft 38 has fixed thereon a first commutator 42 connected to the first multiple winding 40 and a second commutator 43 connected to the second multiple winding 41. Further, a set of brushes 44 is forcibly put in contact with the first commutator 42 and another set of brushes 46 is likewise put in contact with the second commutator 43 are accommodated in brush holders 45, 47 fixed to the stator 2, respectively. The brushes 44, 46 have leading wires thereof taken out of the stator 2 through non-magnetic pipes 2a, 2b, respectively. In the foregoing arrangement, the magnets 36, the first multiple winding 40, the first commutator 42, and the brushes 44 are cooperating to constitute a direct-current generator 48 as a motor speed sensor for detecting the number of revolutions per unit time of the rotor 37 of the electric motor 33. The generator 48 it thus to be employed for giving an output signal of a direct-current voltage proportional to the revolution number of the rotor 37. On the other hand, the magnets 36, the second multiple winding 41, the second commutator 43, and the brushes 46 are cooperating to constitute a proper electrical part of the electrical motor 33 for producing auxiliary torque.

The reduction gearing 50 comprises two stages 51, 52 of planetary gear arranged around the output shaft 7. As shown in FIG. 1, the primary stage 51 consists of a primary sun gear 38a formed along the outer circumference of the left end part of the tubular shaft 38, the right half of a common ring gear 53 formed along the inner circumference of the casing 3, a triple of primary planet gears 54 interengaged between the sun and the ring gears 38a, 53, and a first carrier member 55 for pivotally supporting the planet gears 54. The carrier member 55 is loose-fitted on the output shaft 7. The secondary stage 52 consists of a secondary sun gear 56a formed along the outer circumference of a tubular member 56 integrally joined with the first carrier member 55, the left half of the common ring gear 53, a triple of secondary planet gears 57 interengaged between the sun and the ring gears 56a, 53, and a second carrier member 58 for pivotably supporting the planet gears 57. The carrier member 58 has integrally formed therewith at the radially inner side thereof, an inner tubular portion 60 supported by the output shaft 7 through a bearing 59 and at the radially outer side thereof an outer tubular portion 61 extending along the inner circumference of the casing 3. The outer tubular portion 61 is provided with inner teeth 61a formed along the inner circumference thereof. Therefore, when the rotor 37 of the electric motor 33 rotates, the rotation of the rotor 37 is transmitted through the tubular shaft 38, the primary sun gear 38a, the primary planet gears 54, the first carrier member 55, the secondary sun gear 56a, and teh secondary planet gears 57 to the second carrier member 58 and thus to the outer tubular portion 61 thereof, while being reduced in speed.

In the electromagnetic clutch 63, a rotor 64 thereof is rotatably supported through a bearing 66 on a ring member 65 which is pline-fixed on the output shaft 7. The rotor 64 is elastically connected to the output shaft 7 by means of a ring-like elastic member 67. The rotor 64 of a tubular form is provided with an axial extension extending so long as it surrounds the inner tubular portion 60 of the second carrier member 58. The extension has a pair of projections 64a radially inwardly projecting from the inner circumference thereof toward the outer circumference of the output shaft 7. As shown in FIG. 5, the radial projections 64a are inserted in a pair of slots 65a formed in the ring member 65, with a necessary circumferential gap left therebetween, respectively, so as to have an angularly engaged relation to the ring member 65. Accordingly, the rotor 64 is to be kept elastically interconnected with the output shaft 7 within a relatively angular displacement therebetween corresponding to the circumferential gap or before the projections 64a of the rotor 64 are brought into abutment with the ring member 65. The axial extension of the rotor 64 has along the outer circumference thereof outer teeth 64b formed thereon, and further the rotor 64 has, at a position thereon at the opposite end of the axial extension thereof relative to the second carrier member 58, a disc-like support plate portion 64c projecting in the radial direction. Between the support plate portion 64c of the rotor 64 and the second carrier member 58, there are alternately disposed a plurality of disc-like plates 68 having cut in the outer circumferences thereof grooves meshing with the inner teeth 61a of the outer tubular portion 61 of the carrier member 58 and a plurality of disc-like plates 69 having cut in the inner circumferences thereof grooves meshing with the outer teeth 64b of the axial extension of the rotor 64, thereby constituting a multi-plate clutch mechanism. In FIG. 1, designated at reference numeral 70 is a stopper of the plates 69.

Moreover, at the axially outer end of the casing 3 is provided an annulus 64 fixed therein, which has a channel-like cross section. The annulus 64 has accommodated therein an annular excitation coil 72 electrically connected through a leading wire to the control device 75. Thus, with current conduction through the excitation coil 72, there is developed a field of electromagnetic force to thereby attract, through an unshown suitable implement, the aforementioned plates 68, 69 together toward the coil 72. Thus, auxiliary torque, having been transmitted from the electric motor 33 to the outer tubular portion 61 of the second carrier member 58 in a speed-reducing manner through the reduction gearing 50, can normally be further transmitted through the multi-plate clutch mechanism consisting of the elements 61a, 68, 69, and 64b, the rotor 64, and the elastic member 67 to the output shaft 7.

In this respect, in a state in which the rotor 64 has been rotated relative to the output shaft 7 until the relative angular displacement therebetween reaches a predetermined value, the radial projections 64a from the axial extension of the rotor 64 are put into abutment with the corresponding side faces of the slots 65a in the ring member 65, so that the auxiliary torque by the electric motor 33 is mechanically transmitted from the rotor 64 to the output shaft 7 in a non-elastic manner.

Description will now be made of the control device 75 as a control circuit of the electromagnetic servo device 200, with reference to FIG. 6.

Figure 6:
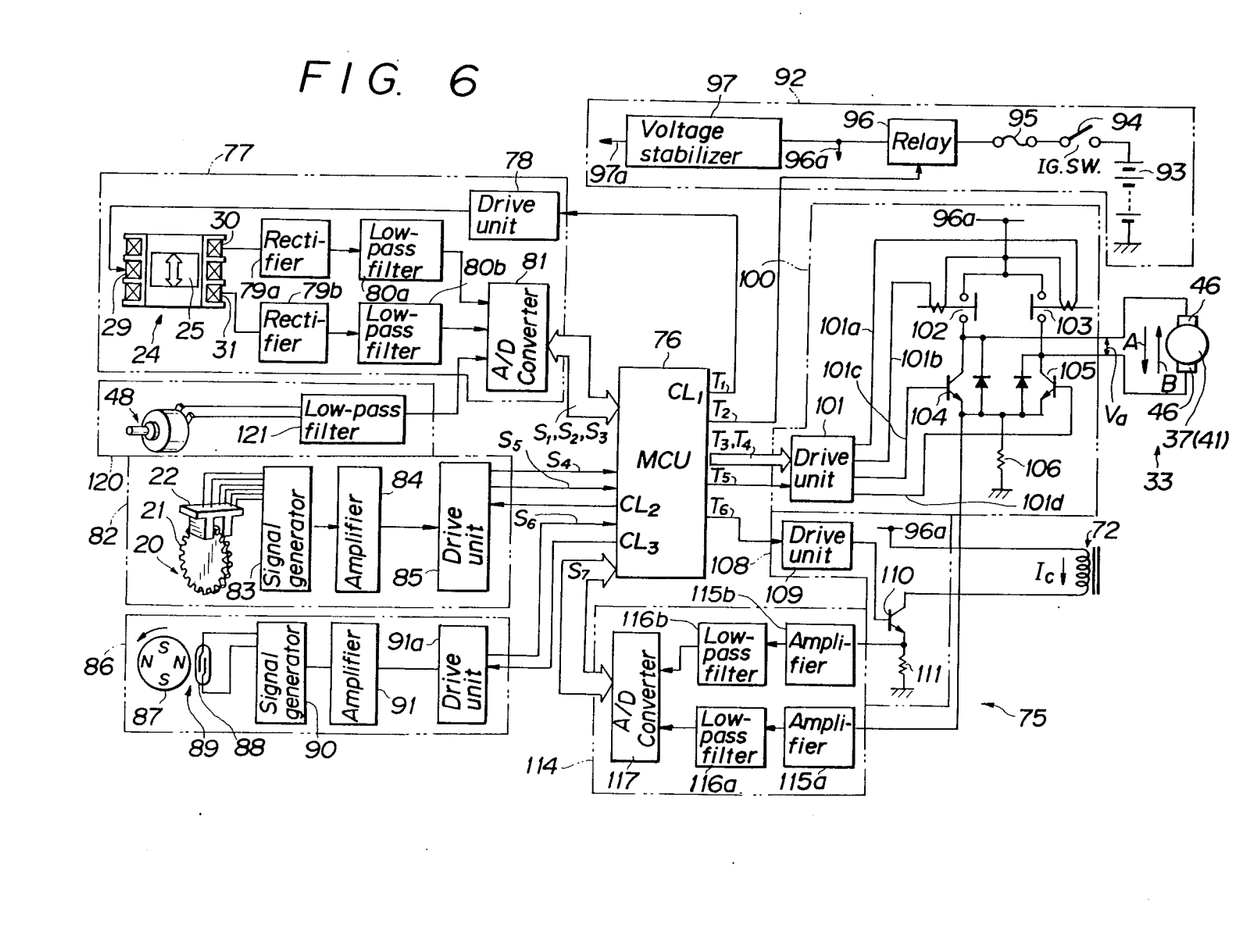
FIG. 6 is a detailed block diagram of a control circuit of the electromagnetic servo device.

In FIG. 6, designated at reference number 76 is a micro-computer unit. The micro-computer unit 76 has input thereto respective detection signals $S_1$ to $S_7$ output from a steering torque detection circuit 77, a steering speed detection circuit 82, a vehicle speed detection circuit 86, a motor speed detection circuit 120, and an abnormality detection circuit 114.

The steering torque detection circuit 77 comprises the aforementioned steering torque sensor 24, a drive unit 78 for outputting a reference clock pulse $T_1$ in the micro-computer unit 76, while dividing the clock pulse at a number of stages, to the primary winding 29 of the steering torque sensor 24. A pair of rectifiers 79a, 79b, rectifies respective analog electric signals given from the secondary windings 30, 31 of the torque sensor 24 in accordance with the axial displacement of the mobile core member 25 of the sensor 24. A pair of low-pass filters 80a, 80b eliminates high frequency components of those signals as rectified, and an A/D (analog to digital) convertor 81 converts respective analogue electric signals from the low-pass filters 80a, 80b into a pair of digital signals to be output as steering torque signals $S_1$, $S_2$ to the micro-computer unit 76.

The motor speed detection circuit 120 comprises the aforementioned generator 48 as a motor rotation speed sensor, and a low-pass filter 121 for eliminating high-frequency components of an analog voltage signal output from the generator 48. An analog voltage signal output from the low-pass filter 121 is input to the A/D converter 81, where it is converted into a digital signal to be output as armature speed signal $S_3$ representing the rotation speed of the armature 37 corresponding to the number Nm of the revolutions per minute thereof. As explained later, the motor speed detection circuit 120 is to function as a feedback signal generator.

The steering speed detection circuit 82 comprises the aforementioned steering speed sensor 20, a pulse generator 83 to apply electric power to the light-projecting part of the photo-coupler 22 in the steering speed sensor 20 and to change an electric signal output from the light receiving part of the photo-coupler 22 to a suitable pulse signal to be output. An amplifier 84 amplifies the output signal from the pulse generator 83 to adjust the waveform and phase. A drive unit 85 determines, on the basis of a pulse signal output from the amplifier 84 and a clock pulse from a terminal $CL_2$ of the micro-computer unit 76, the steering rotation speed Ns for outputting a steering speed signal $S_4$ and for counting the number of impulses of the pulse signal from the amplifier 84 to thereby output a steering angle signal $S_5$.

The vehicle speed detection circuit 86 comprises a vehicle speed sensor consisting of a magnet 87 to rotate together with the rotation of an unshown speed meter cable and a reed switch 88 to turn on and off in accordance with the rotation of the magnet 87. A pulse generator 90 applies electric power to the reed switch 88 to take out the make-break actions of the switch 88 as an output pulse signal. An amplifier 91 amplifies to adjust the waveform and phase of the output signal from the pulse generator 90. A drive until 91a determines, on the basis of a pulse signal output from the amplifier 91 and a clock pulse from another terminal $CL_3$ of the micro-computer unit 76 the speed V of the vehicle to output a vehicle speed $S_6$.

The micro-computer unit 76 comprises necessary unshown I/O (input and output) ports, memory, processor, and controller.

An electric power circuit 92 is provided for driving the micro-computer unit 76 as well as other circuits. The electric power circuit 92 comprises a normally-closed relay 96 which is installed in a power line lead out from a positive terminal of a battery 93 mounted on the vehicle through a key switch 94 of an ignition switch IG.SW. and a fuse, and a voltage stabilizer 97 to which electric power is supplied through the relay 96. The relay 96 is provided with an output terminal 96a for applying electric power from the battery 93 to an electric motor drive circuit 100 and an electromagnetic clutch drive circuit 108. The voltage stabilizer 97 has output terminal 97a for applying stabilized power to the micro-computer unit 76 and other circuit elements. Therefore, while the key switch 94 is turned on, the micro-computer unit 76 is put in an energized state thereof, where it is permitted to process the respective input signals $S_1$ to $S_7$, following a program stored in the memory. The micro-computer outputs a triple of control signals $T_3$, $T_4$, $T_5$ to be used for driving the electric motor 33. Also output by the micro-computer is a clutch current control signal $T_6$ to be used for driving the electromagnetic clutch 63 to the motor drive circuit 100 and the clutch drive circuit 108, respectively. The micro-computer thereby controls the driving of the motor 33 and the clutch 63. Among the control signals, $T_3$ and $T_4$ are a clockwise rotation representative and a counterclockwise rotation representative signals, respectively. The signals $T_3$ and $T_4$ are responsible for determining the terminal polarity of an armature voltage Va to be applied to the electric motor 33 in correspondence to the steering direction of the steering wheel. The signal $T_5$ is a voltage control signal responsible for determining the armature voltage Va.

The electric motor drive circuit 100 comprises a drive unit 101, and a bridge circuit consisting of a pair of relays 102, 103, and a pair of npn transistors 104, 105. In the bridge circuit, the relays 102, 103 have a common supply terminal thereof connected to the output terminal 96a of the relay 96 of the power circuit 92. The transistors 104, 105 have the emitters thereof connected through a resistor 106 to ground as a common side. Respective excitation coils of the relays 102, 103 and the bases of the transistors 104, 105 are connected to output terminals 101b, 101a and 101c, 101d of the drive unit 101, respectively. The collectors of the transistors 104, 105 cooperate with each other to provide a potential difference to be applied as the armature voltage Va through the aforementioned brushes 46, 46 across the second multiple winding 41 as an armature winding of the electric motor 33.

The drive unit 101 of the motor drive circuit 100 drives the relay 102 or 103 and the transistor 105 or 104 in accordance with the rotation direction representative control signals $T_3$, $T_4$. The drive unit outputs a pulse signal, as a series of PWM (pulse duration modulation) waves obtained by modulating the duration of a rectangular-pulse signal of a constant frequency in accordance with the voltage control signal $T_5$, to the base of either of the transistors 104, 105.

Accordingly, in a state in which, being given the steering torque representative detection signals $S_1$, $S_2$ representing steering torque of a certain magnitude clockwise acting on the input shaft 4, the micro-computer unit 76 has output in a later-described manner the clockwise rotation representative and the counterclockwise rotation representative signals $T_3$, $T_4$ as set "high" and "low", respectively. Also output is the voltage control signal $T_5$ with a signal value corresponding to the steering torque above. The drive unit 101 excites the relay 102 through the terminal 101b and concurrently the drive unit applies the aforementioned pulse signal, which is duration-modulated in accordance with the value of the voltage control signal $T_5$, through a terminal 101d to the base of the transistor 105. Under such a condition, the armature voltage Va to be applied across the electric motor 33 is proportional in effective value to the duration of the modulated pulse signal and has such a terminal polarity that an armature current Ia runs in a direction A of conduction forcing the motor 33 to rotate clockwise.

In the above case, the drive unit 101 has no exciting current output through the terminal 101a and no pulse signal output through the terminal 101c, so that the relay 103 remains de-energized and the transistor 104 remains off.

In a state in which steering torque of a certain magnitude is counterclockwise acting on the input shaft 4 and thus the micro-computer unit 76 has output the clockwise rotation representative and the counterclockwise rotation representative signals $T_3$, $T_4$ as set "low" and "high", respectively. The computer also outputs the voltage control signal $T_5$ with a signal value corresponding to the steering torque. Then a sequence of direction-reversed processes causes the relay 103 to be excited. Concurrently the transistor 104 is turned on, so that the armature current Ia runs through the electric motor 33 in a direction B of rotation forcing the motor 33 to rotate counterclockwise.

In other words, in the electric motor drive circuit, 100, there is performed a process for controlling the direction of rotation of the electric motor 33 by selective current conduction to a combination of relay 102 and transistor 105 or an opposite combination of relay 103 and transistor 104. In addition, the circuit performs a process for effecting a conduction period control of the transistors 104, 105 by modulating the duration of pulses to be applied to the bases of the transistors 104, 105, while applying across the electric motor 33 the armature voltage Va having an effective value corresponding to the conduction period control. Thus, the motor 33 is controlled so as to produce auxiliary torque in correspondence to the steering torque applied to the steering wheel.

The electromagnetic clutch drive circuit 108 comprises a drive unit 109 and an npn transistor 110. The transistor 110 is connected at the collector via the excitation coil 72 of the electromagnetic clutch 63 to the aforementioned output terminal 96a of the relay 96 in the power circuit 92. The emitter of transistor 110 is connected through a resistor 111 to ground at a common side. The base is connected to an output terminal of the drive unit 109. The drive unit 109 outputs a pulse signal to stop the base of the transistor 110. The pulse signal's duration is modulated in accordance with the clutch current control signal $T_6$ output from the micro-computer unit 76. Accordingly, in the clutch drive circuit 108, there is performed at the drive unit 109 a process for effecting a current conduction control of the transistor 110 in accordance with the clutch current control signal $T_6$, to thereby control the torque transmission of the electromagnetic clutch 63.

As described, in the present embodiment of the invention, there is employed the abnormality detection circuit 114, which detects abnormalities of the electric motor 33 and the electromagnetic clutch 63. The abnormality detection circuit 114 comprises an amplifier 115a for amplifying a voltage signal taken from a terminal of the aforementioned resistor 106 in the motor drive circuit 100, and another amplifier 115b for amplifying a voltage signal taken from a terminal of the aforementioned resistor 111 in the clutch drive circuit 108. A pair of low-pass filters 116a, 116b eliminates high-frequency components of output signals from the amplifier 115a, 115b, respectively. An A/D (analog to digital) converter 117 converts analog signals output from the low-pass filters 116a, 116b into a digital detection signal to be output as the aforementioned signal $S_7$ to the micro-computer unit 76. In this respect, this detection circuit 114 detects abnormalities of the electric motor 33 and the electromagnetic clutch 63 by checking respective terminal voltages of the resistors 106, 111. In the case where an abnormality is detected by the circuit 114, the micro-computer unit 76 enters in a later-described manner an abnormality diagnosis process, where it functios to output a relay control signal $T_2$ to the relay 96 of the power circuit 92 to thereby interrupt the power supply to circuit elements.

There will be described below various programmed functions of the micro-computer unit 76.

Figure 7:
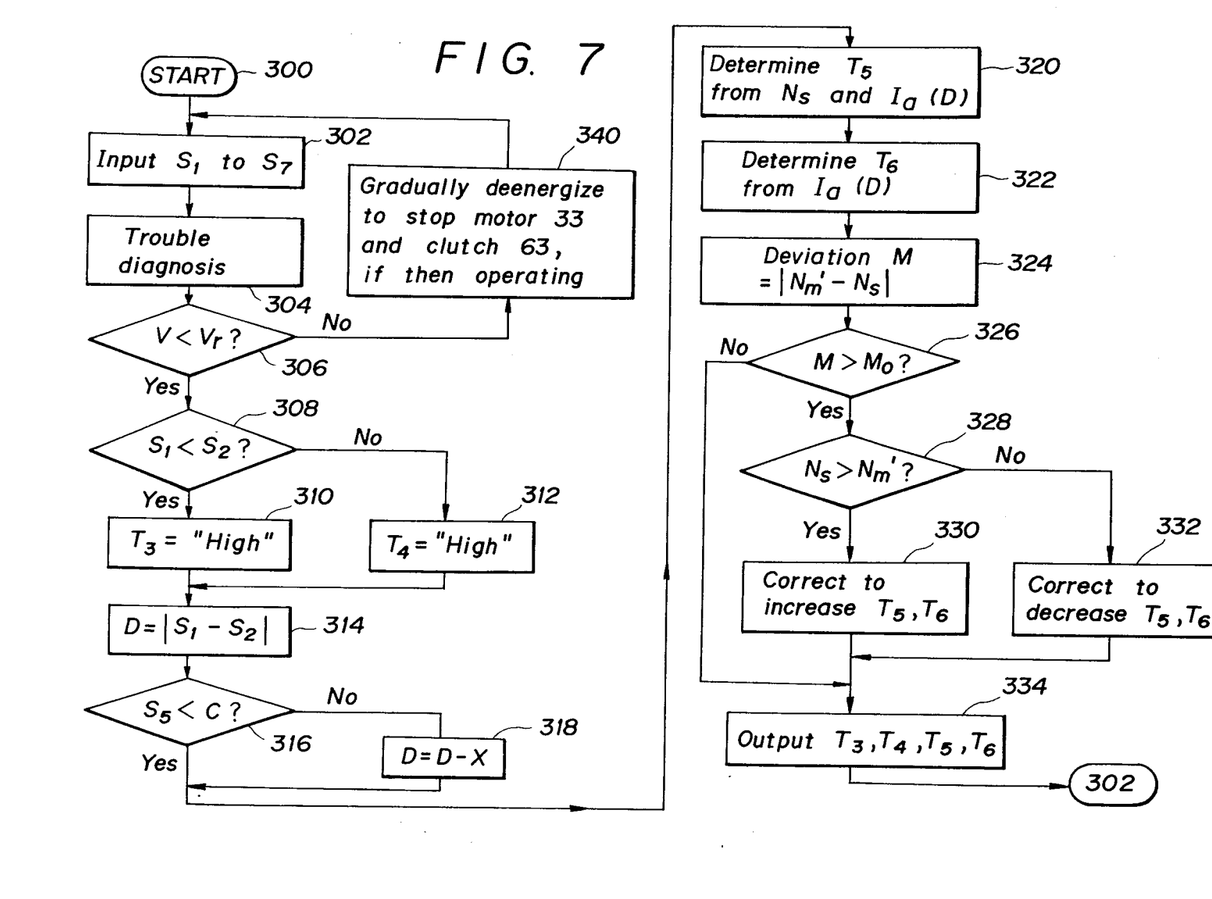
FIG. 7 is a schematic flowchart of control processes to be performed by a micro-computer unit in the control circuit of FIG. 6.

FIG. 7 is a flow chart schematically showing various control processes in the micro-computer unit 76. In FIG. 7, designated reference numerals 300 to 340 are process steps.

By turning on the key switch 94 of ignition key at the power circuit 92, the micro-computer 76 as well as other associated circuits have electric power applied thereto and are permitted to exhibit control functions thereof.

First, at the step 300, various parameters and factors as well as circuits in the micro-computer unit 76 are initialized, as required.

Then, at step 302, the detection signals $S_1$ to $S_7$ from the respective detection circuits 77, 82, 86, 114, 120 are input to be read and stored.

At the next step 304 which is step in a sub-routine, a diagnosis is made whether the detection signals $S_1$ to $S_7$ are proper or not, by checking them for abnormalities. If any abnormality is found, then the relay control signal $T_2$ is output from the micro-computer unit 76 to the realy 96, thereby interrupting the power supply from the power circuit 92, so that the power assist function of the electric power steering system stops, allowing the steering system to be operated by only the vehicle driver's strength.

More particularly, the control circuit 75 then stops controlling the electric motor 33. In cases where, under such a condition, with steering torque applied to the steering wheel the input shaft 4 is caused to rotate in either direction, the torque transmission from the input shaft 4 to the output shaft 7 initially is effected through the torsion bar 8, giving rise to an increasing torsional deformation thereof. And, if the output shaft 7 has such a load torque imposed thereon that is so much larger than the steering torque to cause the relative angular displacement between the input and the output shafts 4, 7 to develop unit until it reaches a predetermined value, then at this time, the aforementioned projections 7a of the axially innermost part of the output shaft 7 are brought into abutment with corresponding side walls of the grooves 17 formed at the inner end of the second shaft 6 of the input shaft 4 to establish an engaged relation therebetween in which the output shaft 7 is mechanically and integrally rotated with the input shaft 4 in a corresponding one direction. Such an engagement relation between the projectios 7a of the output shaft 7 and the grooves 17 of the second shaft 6 of the input shaft 4 provides a fail-safe function to the electromagnetic servo device 200.

In case the detection signals $S_1$ to $S_7$ are all normal and proper, then at the decision step 306, relying on the vehicle speed representative detection signal $S_4$, a determination of whether or not the vehicle speed V is smaller than a reference vehicle speed Vr is made.

If the vehicle speed V is larger than the reference speed Vr, the program flow goes to the step 430, which includes a process for gradually deenergizing to stop the electric motor 33 and the electromagnetic clutch 63 if these are then operating. Namely, the armature voltage Va or the armature current Ia is gradually decreased to the electric motor 33, as then being applied or conducted thereto, and the excitation current Ic to the electromagnetic clutch 63, as then being conducted thereto, to thereby stop the operation of the motor 33 and the clutch 63. Subsequently to such a process at the step 340, the program flow again goes to the step 302.

In the case the vehicle speed V is smaller than the reference speed Vr, then at the decision step 308 a comparison of a signal value is made between the steering torque representative detection signals $S_1$, $S_2$ from the steering torque detection circuit 77 to thereby determine whether the steering direction of the steering torque is clockwise or counterclockwise whereupon either the clockwise rotation representative or the counterclockwise rotation representative signals $T_3$, $T_4$ should be set "high".

More particularly, at step 308, the program determines whether or not the signal value of the clockwise steering torque representative signal $S_2$ is larger than that of the counterclockwise steering torque representative signal $S_1$. Then, if $S_2$ is larger than $S_1$ the program flow goes to step 310, where the clockwise rotation representative signal $T_3$ is set "high". If $S_2$ is smaller than $S_1$, program flow goes to step 312, where the counterclockwise rotation representative signal $T_4$ is set "high".

AFter the above processes, the program flow goes to step 314, where an operation is performed to determine the magnitude D as an absolute value of steering torque from the steering torque representative signals $S_1$, $S_2$, such that $D=|S_1-S_2|$.

Then, at decision step 316 an unloading control process is performed. In other words, the steering angle $S_5$, if the steering angle is determined to be larger than a predetermined value C, the steering wheel has come close to the steering end thereof, therefore a compensation operation is made at step 318, such that compensated $D=D-X$, where X is a predetermined correction value.

Thereafter, at step 320, depending on the steering speed Ns as represented by the steering speed signal $S_4$ output from the steering speed detection circuit 82 as well as on the magnitude D of steering torque determined and/or compensated as described, the signal value of the voltage control signal $T_5$ is determined. The signal $T_5$ is responsible for the determination of the armature voltage Va, by way of memory address designation.

Description will now be directed to how to determine the signal value of the voltage control signal $T_5$ in practice.

As will be easily understood, the input shaft 4 and the electric motor 33 are interconnected through the reduction gearing 50 and the electromagnetic clutch 63 with the output shaft 7 that is inherently needed to be rotated substantially at the same rotation speed or angular velocity as the input shaft 4. Between the input shaft 4 and the electric motor 33 exists a relation that $Nm_i=K\times Ns_i$, where $Nm_i$ is the rotation speed in terms of the number of revolutions per unit time that the motor 33 is required to have when the input shaft is rotated at a steering speed $Ns_i$. K is the gear ratio of the reduction gearing 50 that is given in terms of the ratio of drive side speed to driven side speed. In this respect, the electromagnetic clutch 63 fundamentally is put in service so as to transmit torque from the reduction gearing 50, to the output shaft 7, while the excitation current Ic to the clutch 63 is controlled in a later described manner.

Necessary rotation speed Nm of the electric motor 33 is thus determined from the steering speed Ns.

Figure 8:
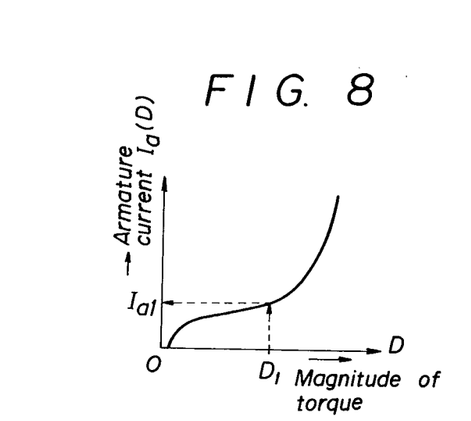
FIG. 8 is a graph showing the relationship between a signal of steering torque and the armature current of an electric motor of the electromagnetic servo device.

In the micro-computer unit 76, the memory has stored, in a continuously addressed manner in a certain area thereof, a set of numerical data of the armature current Ia as a function Ia(D) of the magnitude D of steering torque, whereas the current Ia has such a relation to the magnitude D of steering torque as shown in FIG. 8. Accordingly, when given a vlue of the magnitude D of steering torque, the unit 76 can determine the value of necessary armature current Ia(D) as one of the stored data to be identified by simply designating a corresponding address, without performing extra computations.

Figures 9, 10:
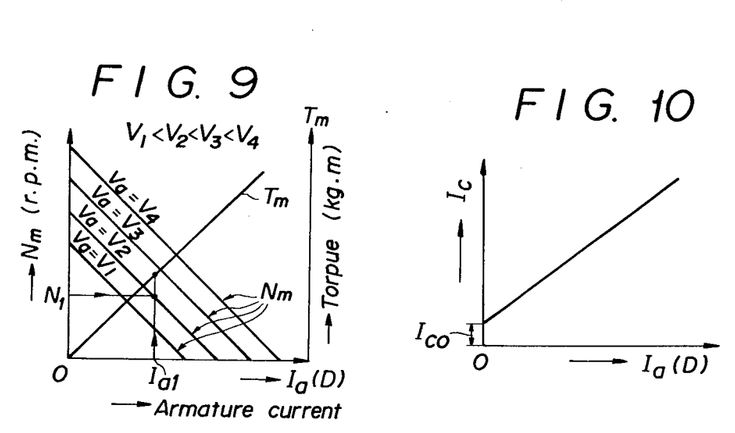
FIG. 9 is a graph for describing operational characteristics of the electric motor of the electromagnetic servo device showing relationships among armature current, revolution number, and load torque of the motor.
FIG. 10 is a graph showing the relationship between the armature current of the electric motor and a drive current of a magnetic clutch of the electromagnetic servo device.

Moreover, as will be comprehended from FIG. 9 which shows operating characteristics of the direct-current motor 33, while the armature voltage Va applied across the motor 33 is kept constant, the armature current Ia increases and the motor rotation speed Nm decreases in proportion to an increase in load torque Tm on the motor 33. On the other hand, where the load torque Tm is constant, the motor rotation speed Nm increases as the armature voltage Va increases, while the armature current Ia is kept constant.

At this point of description, it understood that the necessary motor rotation speed Nm is determined from the steering speed Ns, and the necessary armature current Ia(D) is determined by the address designation according to the magnitude D of the steering torque.

The memory of the micro-computer unit 76 has stored, in a matrixingly continuously addressed manner in another area thereof, a set of numerical data of the armature voltage Va as a function of both the motor rotation speed Nm and the armature current Ia in correspondence to such relations as shown in FIG. 9. Accordingly, when given respective values of the motor rotation speed Nm and the armature current Ia, the micro-computer 76 can determine the value of the necessary armature voltage Va as one of the stored data to be identified by simply designating a pair of corresponding addresses. Exemplarily, in a case where the necessary motor rotation speed Nm is determined to be $N_1$ in FIG. 9 and the magnitude D of steering torque is given as a value $D_1$ in FIG. 8 and hence the necessary armature current Ia(D) is determined to be $Ia_1$ in FIGS. 8, 9, a value $V_2$ in FIG. 9 is determined as the necessary armature voltage Va.

In correspondence to a thus determined value of the necessary armature voltage Va, the voltage control signal $T_5$ is determined.

Practically, however, numerical data of the armature voltage Va are stored so as to permit the voltage Va to be determined by address designation according to respective values themselves of the steering speed Ns and the armature voltage current Ia(D), without determining the necessary motor rotation speed Nm from the steering speed Ns. The reason such an operation is possible resides in the proportional relation or linearity between the motor speed Nm and the steering speed Ns.

Accordinglyl, the armature voltage Va is determined by address designation based ont eh steering torque representative signals $S_1$, $S_2$ and the steering signal $S_4$, thus resulting increased control speed of the micro-computer system 76.

Referring again to the flow chart of FIG. 7, at step 322, the clutch current control signal $T_6$ for the electromagnetic clutch 63 is determined according to the magnitude D of steering torque. In respect of the signal $T_6$ also, the determination is made by way of address designation. More particularly, first the clutch excitation current Ic is determined by address designation according to the necessary armature current Ia(D) which is determined from the computed magnitude D of steering torque. In this respect, the clutch current Ic has a relation to the armature current Ia(D) as shown in FIG. 10. Then, in correspondence to the thus determined clutch current Ic, the clutch current control signal $T_6$ is determined. Incidentally, in FIG. 10, designated at reference character Ico is bias current component of the clutch current Ic that is supplied for necessary absorption such as frictional forces.

Then, at step 324, with respect to the steering speed Ns as represented by the steering speed signal $S_4$ from the steering speed detection circuit 82 and an apparent motor speed Nm' represented by the motor speed signal $S_3$ from the motor speed detection circuit 120, there is obtained a deviation M therebetween, such that $M=|Nm'-Ns|$. In other words, the deviation M is determined as the absolute value of the difference between the apparent motor speed Nm' and the steering speed Ns, whereas such deviation may be otherwise represented, exemplarily in terms of a ratio between the steering speed Ns and the product of the motor rotation speed Nm and the gear ration K of the reduction gearing 50. In this respect, the generator 48 of the motor speed detection circuit 120 has an output characteristic which assures a relation such that $Nm'=Nm/K$, where Nm' and Nm are the apparent and actual motor speeds, respectively, and K is the aforementioned gear ratio. Thus, the apparent motor speed Nm' is of a nature directly comparable with the steering speed Ns.

Then, at the decision step 326, the magnitude of the deviation M is determined by $M>M_0$, where $M_0$ is a predetermined critical value. If the deviation M is found within a permissible range under the value $M_0$, the program flow goes to step 334 which is an output step at which the control signals $T_3$, $T_4$, $T_5$, $T_6$ are output, as determined till then, without correcting the armature voltage control signal $T_5$ and the clutch current control signal $T_6$.

When the deviation M is larger than the value $M_0$, the program flow goes to the next decision step 328, where the apparent motor speed Nm' and the steering speed Ns are compared with each other by $Ns>Nm'$.

Then, if the steering speed Ns is faster than the apparent motor speed Nm', the program flow goes to step 330, where an increasing correction of the voltage control signal $T_5$ is made to increase the armature voltage Va to thereby raise the actual rotation speed Nm in terms of revolution number of the electic motor 33. In correspondence thereto, an increasing correction of the clutch current control signal $T_6$ is performed.

If the steering speed Ns is smaller than the apparent motor speed Nm', the program flow goes to step 332, where a decreasing correction is made to the voltage control signal $T_5$ to thereby lower the actual motor speed Nm as well as of the clutch current control signal $T_6$. Thereafter, the program flow goes to the output step 334.

By the correction of the control signals $T_5$, $T_6$ through steps 324, 326, 328, 330 and 332, there are eliminated very small variations in the operation of the electric motor, as well as elementary fluctuations of steering feeling due to very small variations due to frictional elements in the electromagnetic clutch 63 and the reduction gearing 50.

At the output step 334, the motor rotation direction controlling signals $T_3$, $T_4$ and the armature voltage control signal $T_5$ are output, as corrected when necessary, to the electric motor drive circuit 100. The clutch current control signal $T_6$ is output, as corrected when necessary, to the electromagnetic clutch drive circuit 108.

As described, at the motor drive circuit 100, a PWM control is made to the armature voltage Va of the electric motor 33, depending on the rotation direction controlling signals $T_3$, $T_4$ and the voltage control signal $T_5$. Concurrently, at the clutch drive circuit 108, the excitation current Ic to the electromagnetic clutch 63 is PWM controlled, depending on the clutch current control signal $T_6$, so that the clutch 63 has a controlled clutching force proportional to the armature current Ia or output torque Tm of the electric motor 33, thereby effectively preventing useless or extra consumption of electric power at the clutch 63.

Finally, the program again goes to step 302.

Figure 11:
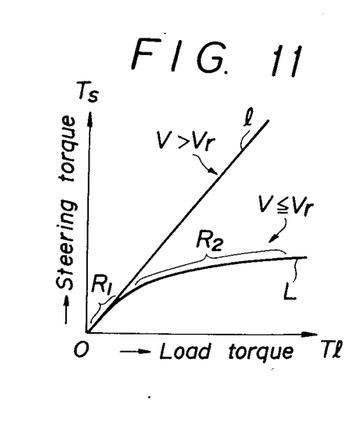
FIG. 11 is a graph showing the relationship between load torque and steering torque acting on the electromagnetic servo device.

FIG. 11 is a graph showing, for manual or powerless operation and power-assisted operation, respective relations between steering torque Ts acting on the input shaft 4 and load torque T1 imposed from the steering gearbox onto the output shaft 7. Designated by small letter 1 is a straight-linear characteristic to be experienced in the powerless operation of the electric power steering system, and capital letter L is a curvillinear characteristic in the poweor-assisted operation thereof. In a region $R_1$ which represents small load torque, the power-assisted characteristic substantially overlaps to powerless characteristic. However, in a region $R_2$ which represents large load torque, the powerless characteristic is favorably kept substantially flat. Therefore, as the load torque becomes large, the steering torque can be all the more effectively reduced.

Figure 12:
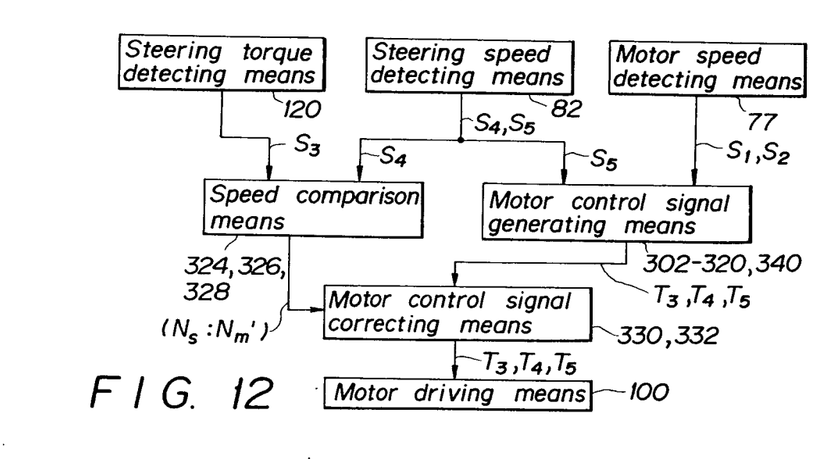
FIG. 12 is a schematic functional block diagram of the control circuit of FIG. 6.

FIG. 12 is a schematic block diagram describing interrelations among various means employed in the control circuit 75 showing connections between essential components of the circuit 75 shown in FIG. 6 and associated process steps in the flow chart of FIG. 7, while omitting the detection signals $S_6$, $S_7$ and the control signals $T_1$, $T_2$, $T_6$.

According to the preferred embodiment of the present invention, the armature voltage Va of the electric motor 33 is determined depending on the steering torque signals $S_1$, $S_2$ and the steering speed signal $S_4$, so that the actual rotation speed Ns of the motor 33 is favorably matched to the steering speed Ns of the input shaft 4 and hence of the steering wheel, thus assuring optimum steering.

Moreover, as a control device of the entire steering system, the control circuit 75 includes the micro-computer unit 76, in which the armature voltage Va is determined from the detection signals $S_1$, $S_2$, $S_3$ by way of address designation, thereby permitting control of the electric motor 33 to be quick enough to effectively follow up the steering speed Ns.

Further, performing fine adjustment of the motor rotation speed Nm in dependence on the motor speed signal $S_3$ as a feedback signal and the steering speed signal $S_4$ reduces undesirous effects which are due to very small variations of working conditions or mechanical small variations such as bearings at the reduction gearing 50 and the electromagnetic clutch 63, as well as small variations in output characteristics of the electric motor 33, thereby additionally improving the steering.

In order to simplify the constitution of the steering system as a whole, there may be advantageously be employed a modified example of the embodiment by eliminating the motor speed detection circuit 120 and associated steps such as the steps 324, 3216, 328, 330, and 332.

Although there has been described what at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicted by the appended claims rather than by the foregoing description.

What is claimed is:

1. An electric power steering system for vehicles comprising:
   an input shaft operatively connected to a steering wheel;

an output shaft operatively connected to a steered wheel;

an electric motor for operatively supplying auxiliary torque to said output shaft;

means for detecting steering torque acting on said input shaft;

means for detecting a steering speed of said input shaft; and driving control means for feeding said electric motor with a drive signal based on output signals from said steering torque detecting means and said steering speed detecting means, said driving control means controlling said electric motor to produce said auxiliary torque and said driving control means controlling said electric motor to rotate at a speed in correspondence to said steering speed so that said rotational speed of said motor corresponds to said steering speed, said driving control means outputting a motor control signal and feeding said motor control signal to said electric motor, said driving control means including a motor driving means for receiving said motor control signal and for feeding said drive signal to said electric motor in accordance with said motor control signal, wherein said driving control means determines an armature current necessary for the electric motor, depending on the output signal of the steering torque detecting means, and determines an armature voltage to be applied to the electric motor depending on a steering speed represented by the output signal from the steering speed detecting means and the armature current; and the drive signal to be fed from the driving control means to the electric motor includes an armature voltage signal.

2. An electric power steering system according to claim 1, wherein said driving control means further includes a micro-computer unit for receiving said output signal from said steering torque detecting means and said output signal from said steering speed detecting means to output said motor control signal representing the content of said drive signal, said micro-computer unit feeding said motor control signal to said electric motor; and said motor control signal is determined by said micro-computer unit in an address designating manner in accordance with both said output signal from said steering torque detecting means and said output signal from said steering speed detecting means.

3. An electric power steering system according to claim 2, wherein said micro-computer unit determines by address designation said armature current and determines by address designation said armature voltage.

4. An electric power steering system according to claim 2, further including means for detecting a rotation speed of said electric motor, wherein said micro-computer unit determines said motor control signal based on an output signal from said motor speed detecting means as well as of said output signal from said steering torque detecting means and said output signal from said steering speed detecting means.

5. An electric power steering system according to claim 4, wherein said micro-computer unit compares a motor speed determined from said output signal from said motor speed detecting means with said steering speed represented by said output signal from said steering speed detecting means, to thereby determine a deviation therebetween, and where said deviation exceeds a predetermined range, correction said motor control signal which is determined by said micor-computer unit by address designation, depending on said deviation, before outputting same to said motor driving means.

6. An electric power steering system according to claim 1, further comprising means for detecting said rotation speed of said electric motor and feeding back an output signal therefrom to said driving control means.

7. An electric power steering system according to claim 1, further comprising electromagnetic clutch means for transmitting torque developed at said electric motor to said output shaft, wherein said driving control means feeds said electromagnetic clutch means with a drive signal depending on said output signal from said steering torque detecting means.

8. An electric power steering system according to claim 7, further comprising a reduction mechanism for transmitting said torque developed at said electric motor to said electromagnetic clutch means, while reducing the speed thereof.

* * * * *